June 17, 1958     H. ISAACS     2,839,207
SIDE-LOADING LIFT-TRUCK

Filed Dec. 26, 1956     2 Sheets-Sheet 1

INVENTOR.
HAROLD ISAACS
BY
ATTORNEYS

June 17, 1958 H. ISAACS 2,839,207
SIDE-LOADING LIFT-TRUCK
Filed Dec. 26, 1956 2 Sheets-Sheet 2
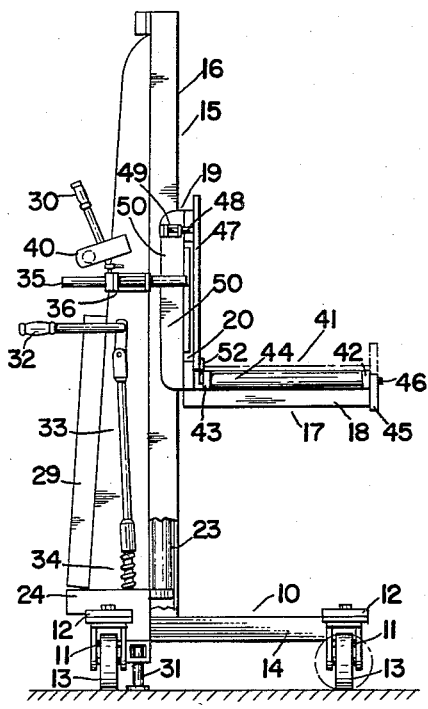
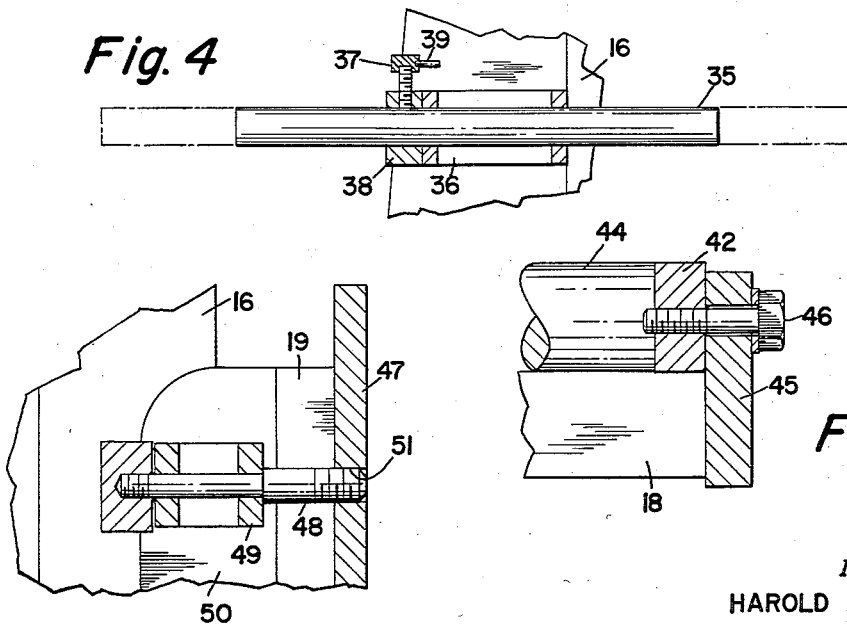
INVENTOR.
HAROLD ISAACS
BY
ATTORNEYS

2,839,207

SIDE-LOADING LIFT-TRUCK

Harold Isaacs, University Heights, Ohio, assignor to Edith Isaacs, University Heights, Ohio Application December 26, 1956, Serial No. 630,638

1 Claim. (Cl. 214—84)

The present invention relates to industrial lift-trucks and more particularly to a power-operated lift-truck which is especially adapted to carry a long load, such as rods or pipe.

In the field of material handling, lift-trucks are extensively utilized for intra-plant movement of materials, as well as for shipping and receiving operations. The fork lift-truck, which is probably the most widely used type of industrial lift-truck, may be considered representative of lift-trucks in general. As is well-known in the art, the fork lift-truck is moved forwardly in the direction of the projecting fork to engage the load to be carried. When the load has been engaged, the truck is moved rearwardly or forwardly to transport the load to its destination. This method of handling is satisfactory for many purposes, but does not lend itself readily to the transportation of materials or parts which are very long. In such cases, the load, which may be lengths of bars or pipe, must be disposed transversely of the direction of travel of the lift-truck and thus requires a very wide passageway or aisleway for its transport. For example, the movement of a bundle of 20 ft. long lumber, would require a passageway at least 20 ft. wide when the bundle is moved in a direction normal to its length, such as occurs in conventional handling by industrial lift-trucks.

It is a primary object of my invention to overcome the aforesaid problems in the mechanical handling of long loads by providing a vehicle or truck which will transport a long load in a direction of travel which is substantially parallel to the longitudinal axis of the load, thus permitting movement of the truck and load through relatively narrow aisleways.

Other objects and advantages of my invention will be apparent during the course of the following description.

In the accompanying drawings forming a part of this specification, and in which like numerals are employed to designate like parts throughout the same, Fig. 1 is a view in front elevation of a lift-truck embodying the features of my invention.

Fig. 3 is a side elevation of the same.

Fig. 4 is a fragmentary cross-sectional view taken as indicated by line 4—4 of Fig. 2 and showing certain details of the push-bar.

Fig. 5 is a fragmentary cross-sectional view taken as indicated by line 5—5 of Fig. 2 and showing certain details of the top-plate securing means.

Fig. 6 is a fragmentary cross-sectional view taken on line 6—6 of Fig. 1 showing the adjustable retainer elements.

Figure 1:
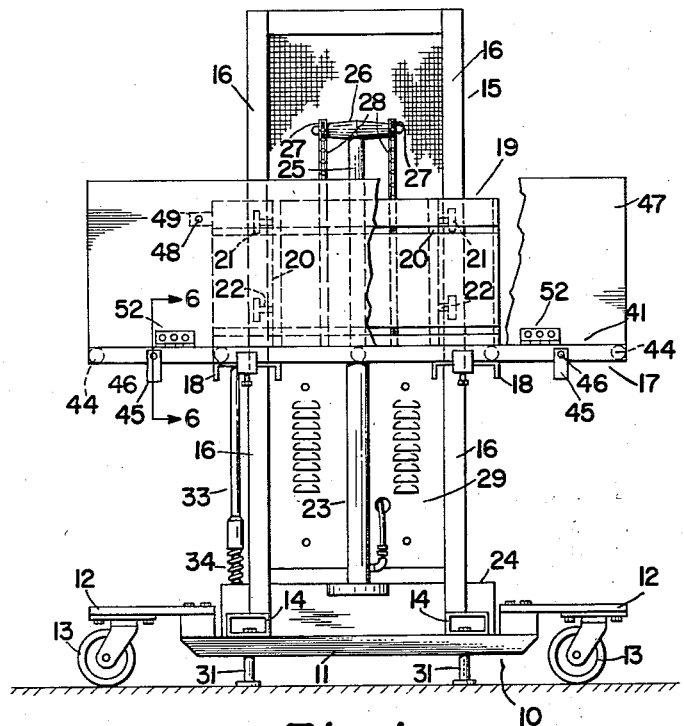
Figure 2:
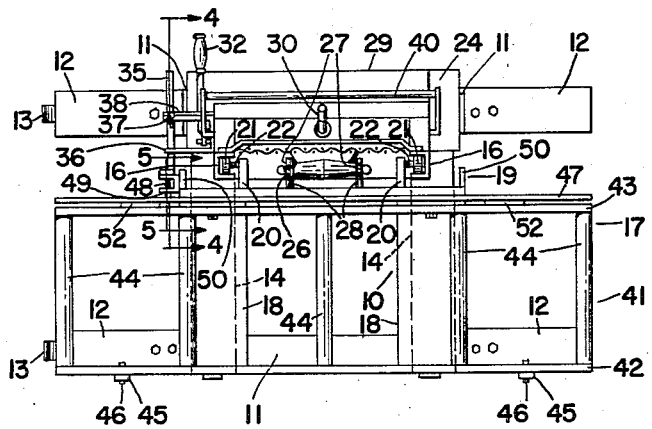
Fig. 2 is a top plan of the lift-truck shown in Fig. 1.

Referring more particularly to Figs. 1, 2 and 3 of the drawings, I have shown a portable, side-loading lift-truck which includes a wheel-supported base structure 10. The base includes a pair of horizontally-spaced side rails 11 which are each provided at the opposite ends thereof with elevated mounting plates 12. To each plate 12 is secured a swivel-lock caster wheel 13, of the type well known in the art.

Rigidly secured to the side rails 11, transversely thereof, are a pair of horizontally-spaced box members 14 which integrate the base structure 10 and also serve as rests or abutments for the load-supporting means to be described.

On the base 10, adjacent one of the side rails 11, is rigidly secured an upright guide or trackway 15 which includes two inwardly facing parallel channel members 16. A carriage 17 is secured to the trackway 15 for movement in a vertical plane. The carriage includes a pair of horizontally-spaced laterally-extending load-supporting members 18, in the form of inverted structural channels, which are so disposed as to overlie and straddle the box members 14. The members 18 are rigidly secured to a vertically-extending carriage plate 19 having spaced arms 20 which are parallel to and intermediate the track members 16. Rollers 21 are mounted on stub shafts 22 secured to the arms 20 and the rollers engage the channel members 16 to guide the carriage 17 in its vertical movements.

Suitable means for elevating the carriage 17 are provided, which, in the embodiment shown, comprises a hydraulic cylinder assembly 23 which is secured to the base 24 of the trackway 15. The piston rod or ram 25 of the cylinder 23 is provided with a crosshead 26 having rotatable sprockets 27 mounted on opposite ends thereof. A pair of chains 28 are trained over the sprockets 27. One end of each chain 28 is anchored to the trackway 15 and the other end of each chain is secured to the carriage plate 19. Fluid under pressure is supplied to the cylinder assembly 23 by means of a motor-driven pump (not shown) which is powered by a storage battery (not shown) all of which are mounted and concealed in a suitable box or container 29 which is secured to the guide 15 out of the path of movement of the carriage 17. A control lever 30, which projects from the upper end of the box 29, can be manipulated to cause or permit raising or lowering movement of the ram 25, through conventional hydraulic valve mechanism. In its normal or neutral position, the lever 30 has the effect of holding or locking the ram 25 in its existing position, and, likewise serves to open the electrical power circuit so that the hydraulic pump is not actuated.

A pair of retractable ground-engaging jacks or legs 31 can be advanced by means of a bell-crank lever 32 and linkage 33 to elevate the base 10 slightly and thus serve as brakes or rests to prevent movement of the truck when it is desired to hold the truck stationary for any purpose. The linkage 33 is spring-loaded, as at 34, to normally maintain the jacks 31 in a retracted position. The bell-crank lever 32 is pivotally secured to a portion of the upright guide 15.

Although a self-propelled truck could be utilized, the unit is so designed that it can readily be pushed or pulled manually for transporting a load. For this purpose, a push bar 35 is provided, which is slidably mounted in a U-shaped bracket 36 which is secured to the upright guide 15 at a convenient height. As best seen in Fig. 4, a securing element in the form of a set screw 37 is threadedly mounted in one arm 38 of the bracket 36 so as to engage the push bar 35 and restrain it against axial movement. However, when the screw 37 is loosened, the bar 35 is freely movable in one direction or another, as indicated in broken lines in Fig. 4, so that the position of the bar may be adjusted to the conditions of the load and a more or less centralized thrust can be exerted on the truck so that directional control of the movement of the truck can be maintained. If the load has to be elevated to a level at which the push bar would interfere with the load, the push bar can be moved to the left so as to be out of the path of vertical movement of the load. A lever 39 is secured to the set screw 37 for convenience in tightening and loosening it, when desired.

Another push bar 40 is fixedly secured to the upright guide 15 at right angles to the push bar 35, for convenience in moving the truck sideways, when desired.

In order to provide a suitable support surface for the long loads which the lift-truck is adapted to carry, I prefer to provide an open conveyor-type platform 41 which is secured to the members 18 for movement therewith. The platform 41 includes spaced frame elements 42 and 43 between which are secured a plurality of parallel horizontally-spaced roller bars 44. The bars 44 may be journalled for axial rotation in the frame elements 42, 43 or, if desired they may be fixedly secured therein. The platform 41 thus provides a satisfactory surface for loading, unloading and supporting lengths of lumber, pipe, bars, rods and other long loads.

A pair of pivotally movable retainer elements 45 are secured to the frame element 42 by means of bolts 46 which threadedly engage the frame element. As best seen in Figs. 3 and 6 the retainers may be locked in an upwardly extending position (as shown in dotted outline in Fig. 3) or may depend downwardly. When the platform 41 is in use for transporting long loads, the retainers 45 are usually locked in the upwardly extending position in order to restrain the load from slipping over the edge of the platform. However, when it is desired that the platform surface be unobstructed, the bolts 46 are loosened to permit the retainers 45 to pivot by gravity to the inoperative position.

In order to further enhance the utility of the lift-truck herein described, I prefer to provide a solid top-plate 47 which is hingedly secured to the frame element 43, as at 52, so that it can be rotated from the solid-line vertical position shown in Fig. 3 to the dotted line horizontal position in which it overlies and rests upon the platform 41. When the top-plate 47 is in use it provides a flat, solid load-supporting surface which is especially suitable for handling heavy, compact articles such as dies, fixtures, castings, etc., which may have to be transported from one machine tool to another.

When the use of the top-plate 47 is not desired, it is pivoted to the vertical position, thus making the platform 41 available for use. As best seen in Fig. 5, the top-plate 47 is held in its vertical position by suitable securing means which, in this instance, comprises a screw-threaded element 48 which is rotatably journalled in a bracket 49 which is secured to a flanged portion 50 of the carriage plate 19. The element 48 is engageable with a threaded opening 51 provided in top-plate 47. This means for securing the top-plate has the advantage of leaving the surface of the top-plate free of projections or obstructions which might interfere with the load when the top-plate is being utilized.

By utilizing the side-loading arrangement herein described, long loads can be readily transported through relatively narrow aisleways which need not be of substantially greater width than the width of the lift-truck itself. Thus, if the lift-truck has an overall width of 34", it can successfully transport 20 ft. lengths of pipe through aisleways which are about 36" wide. This is accomplished by moving the load in the direction of its length. The swivel-lock casters 13 provide added versatility to the lift-truck as any selected pair of casters can be locked in one of two positions which are 90 degrees removed from each other. Thus, if the lift-truck is used for the purpose for which it is primarily intended, the pair of wheels 13 shown at the right in Fig. 1 would ordinarily be locked in the position shown and the wheels shown at the left would be left free to swivel. This arrangement would direct the movement of the lift-truck in the direction of length of a long load. However if, for any reason, the lift-truck is desired to be used in a conventional manner, then the pair of wheels 13 shown at the right in Fig. 3 would be locked in the dotted-line position shown and the wheels at the left would be left free to swivel so that the lift-truck could be moved in a direction transverse to its normal direction of travel. If for any reason extreme maneuverability is desired, all four wheels can be left free to swivel.

It is to be understood that the form of my invention, herewith shown and described, is to be taken as a preferred example of the same, and that various changes in the shape, size and arrangement of parts may be restorted to, without departing from the spirit of my invention, or the scope of the subjoined claim.

Having thus described my invention, I claim:

In a lift-truck, the combination of a base, a vertically extending guide mounted on said base, a load-supporting member movably mounted on said guide for movement in a vertical plane, said member having a laterally projecting portion providing a horizontal load-supporting surface, ground-engaging wheels supporting said base for horizontal movement in a direction transverse to the plane of vertical movement of said projecting portion, and a push bar slidably secured to said guide and selectively movable into and out of the path of vertical movement of said projecting portion.

References Cited in the file of this patent

UNITED STATES PATENTS

| | | |
|---|---|---|
| 480,824 | McKinnon | Aug. 16, 1892 |
| 1,931,484 | Bosserdet et al. | Oct. 24, 1933 |
| 2,411,133 | Hill | Nov. 12, 1946 |
| 2,599,052 | Forman | June 3, 1952 |
| 2,621,811 | Lull | Dec. 16, 1952 |
| 2,665,019 | Lorimer | Jan. 5, 1954 |